E. V. OWEN.
PROCESS AND APPARATUS FOR CATALYZING OILS AND REVIVIFYING THE CATALYST.
APPLICATION FILED MAR. 31, 1922.
1,427,626. Patented Aug. 29, 1922.
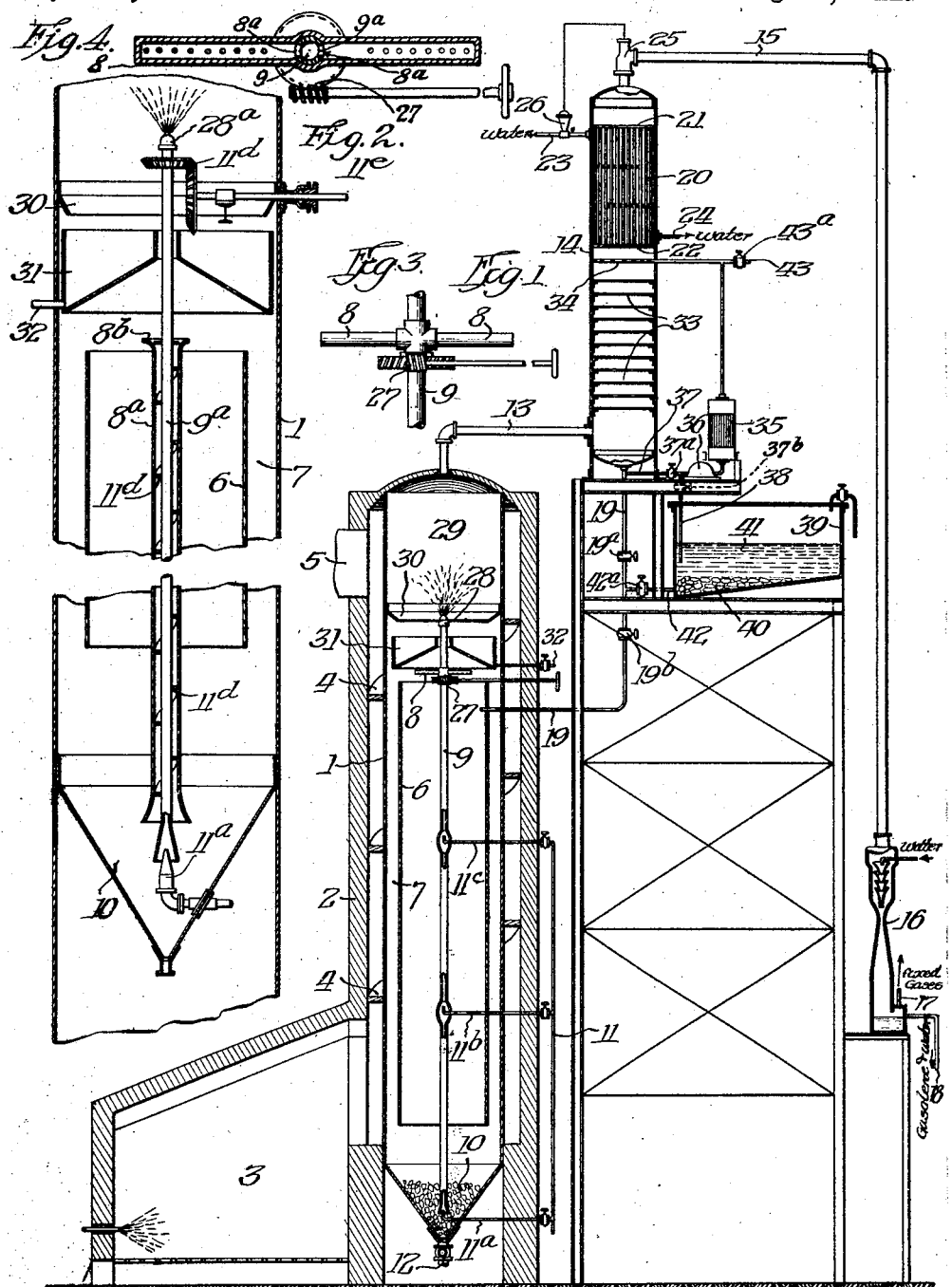

UNITED STATES PATENT OFFICE.

ERNEST V. OWEN, OF CHICAGO, ILLINOIS, ASSIGNOR TO THE HOOVER COMPANY, OF CHICAGO, ILLINOIS, A CORPORATION OF ILLINOIS.

PROCESS AND APPARATUS FOR CATALYZING OILS AND REVIVIFYING THE CATALYST.

1,427,626.　　　　　Specification of Letters Patent.　　Patented Aug. 29, 1922.

Application filed March 31, 1922. Serial No. 548,460.

*To all whom it may concern:*

Be it known that I, ERNEST V. OWEN, a citizen of the United States, residing at Chicago, in the county of Cook and State of Illinois, have invented certain new and useful Improvements in Processes and Apparatus for Catalyzing Oils and Revivifying the Catalyst, of which the following is a specification.

This invention relates to a method of and apparatus for converting heavy hydrocarbon oils into lower boiling point hydrocarbon oils in the presence of a catalyst such as aluminum chloride hydrocarbon catalyst, and particularly to a method and apparatus in which the oil to be treated and the catalyst are circulated through a contact chamber in order to bring them into more intimate relation, and the heat required for distillation is imparted to the oil while separated from the catalyst, as described in the application of Charles O. Hoover, Serial No. 395,337, filed July 10, 1920; and in which for the sake of maintaining temperature favorable to catalyzation the oil and catalyst, respectively, are circulated through two different paths, coinciding in part where catalyzation is to take place, but separate in part so that the oil, to the exclusion of the catalyst may continually flow through the heat absorbing area from which the catalyst is protected.

One object of the invention is to conduct in a unitary or self contained apparatus, with consequent economy in heat and other advantages, the aforesaid circulatory treatment of the oil and catalyst, with separate heating of the oil and protection of the catalyst against the effect of hot surfaces; and, accordingly, one feature of the invention consists in arranging the return flow paths for the oil and catalyst side by side with the catalyzing chamber which constitutes the coinciding portion of the circulatory paths, with the return flow oil passage between the heating wall and the catalyzing chamber so that the body of oil being heated serves as a protection to the catalyst in the catalyzing chamber, and with the return flow passage of the catalyst preferably separated still further from the oil heating passage by an intervening body of combined catalyst and oil to be treated. Preferably, the walls which define the several passages are cylindrical and arranged concentrically so that the return flow oil passage or oil heating chamber surrounds the catalyzing chamber and the return flow catalyst passage is centrally disposed within the catalyzing chamber, as this arrangement best conserves the heat of the process and best protects the catalyst from hot surfaces.

Other features incident to this part of the invention relate to details of construction whereby the general arrangement referred to is obtained and efficiency is insured.

Another object of the invention is to provide for revivifying aluminum chloride hydrocarbon catalyst in a process and apparatus of the kind described, and to this end another feature of the invention consists in utilizing the return flow conduit for the catalyst as a means for discharging the catalyst in finely subdivided form, at a subliming temperature, into a portion of the apparatus from which released aluminum chloride can escape in the form of vapor to absorption apparatus, in which it is recombined with light absorption oils of a consistency that adapts it to be re-delivered into the catalyzing apparatus for use in continuing the process of catalyzation; subordinate features incident to this part of the invention consisting in certain details in the method of procedure and apparatus employed for carrying out the same.

In the accompanying drawing, in which two forms of apparatus are illustrated for practicing the invention—

Figure 1 is a vertical sectional view of the complete apparatus for catalyzing the oil, subliming spent or partially spent aluminum chloride combined in the catalyst, re-combining the sublimed aluminum chloride with hydrocarbon, and returning it to the catalyzing chamber, and means for condensing distillates from the oil.

Figure 2 is a vertical sectional view showing a modification in the construction of the catalyzing and subliming chamber;

Figure 3 is a detail view in side elevation of the means for controlling delivery of catalyst; and Figure 4 is a horizontal section of the same.

1 represents a vertical cylinder surrounded by a fire wall 2. Hot products of combustion from a furnace 3 are delivered to the annular space between the cylinder 1 and the wall 2, and caused by a spiral vane 4 to assume a circuitous path therethrough in reaching the stack flue 5, and insure transfer of their heat units to the wall of the cylinder 1. Mounted concentrically within the cylinder 1, but terminating short of the upper and lower ends thereof, is a cylinder 6 which constitutes the contact chamber of the apparatus, and, in the circulatory type of contact chamber employed in the present invention, constitutes the coinciding portion of the paths of the oil and catalyst; and this cylinder 6 is spaced from the cylinder 1 to develop an annular uptake passage 7 which constitutes the return flow portion of the circulatory path of the oil, as well as the heating chamber for the oil, inasmuch as the oil traverses this passage in contact with the wall 1. Located near the upper end of the contact chamber 6 or near the merger of the return flow oil passage 7 and the contact chamber, is a catalyst distributing head 8 which delivers aluminum chloride hydrocarbon in quantity sufficient to mingle with and catalyze hot oil flowing downward through the contact chamber. The catalyst delivery head 8 is supplied by pipe 9 mounted concentrically within the cylinder 6, and therefore remote from the heating chamber 7 and protected from the heating wall 1 by the wall 6 and the intervening body of oil, and this pipe leads from the settling chamber 10 in which the aluminum chloride hydrocarbon accumulates by gravity. In order to elevate the aluminum chloride hydrocarbon catalyst from the chamber 10 through the pipe 9, a gas pipe 11, which is connected with some suitable source of superheated gas under pressure, is provided with an injector nozzle 11ª discharging into the pipe 9 in an upward direction, and such additional nozzles 11ᵇ, 11ᶜ as may be found necessary to establish flow of catalyst through pipe 9; and in this manner pipe 9 is made to constitute the return flow portion of the path of the catalyst. When it becomes necessary to eliminate heavy or spent catalyst from the chamber 10, this can be done by opening a discharge valve 12 at the bottom thereof.

The operation of the apparatus thus far described is such that when oil is charged into the apparatus to a level that rises up to or above the catalyst delivery head 8, the portion of the oil occupying the uptake 7 will by reason of its contact with the heated wall 1, acquire a sufficiently higher temperature than the main body of oil to cause it to rise and re-enter the contact chamber 6 through the upper end of the latter, the relatively cooler oil in the contact chamber in the meantime flowing down to take its place, and thereby setting up a circulation of the oil downward through the chamber 6 and upward through the passage 7. While this is taking place catalyst is being delivered in sufficiently subdivided streams through the head 8 to thoroughly mingle it with the body of oil in the contact chamber 6, and this produces catalyzation during the downward passage of the oil and catalyst. On arriving at the lower end of the chamber 6, the catalyst, by reason of its greater specific gravity and the momentum which it has acquired in its downward course, will continue into the settling chamber 10, while the oil alone passes into the uptake passage 7 to acquire more heat. The catalyst is simultaneously returned to the upper end of the contact chamber by the action of the gas injectors 11ª, 11ᵇ, and 11ᶜ, and in this manner the oil and the catalyst are caused to circulate, respectively, through two paths, coinciding through a portion thereof which constitutes the contact chamber and which is in a downward direction, but separate and distinct in the upflow or return portions; and the transfer of heat units under furnace 3 takes place in that portion which constitutes the return flow of the oil, so that the catalyst is not brought into contact with hot walls that would have a tendency to cake or coke its hydrocarbon constituent.

Volatiles released from chamber 6 pass to the upper end of cylinder 1, and there escape through a pipe 13 to a reflux chamber 14, which precipitates the heavier fractions along with any aluminum chloride that may have passed upward, while the unprecipitated fractions escape through a pipe 15 to a combined condenser, gas separator, and treater 16, from which fixed gases escape through a pipe 17, while a fraction, such as gasoline, along with water, will flow out through a pipe 18.

Aluminum chloride hydrocarbon condensed in reflux chamber 14 may return therefrom, through pipe 19, directly to the contact chamber 6, or it may be collected, and particularly if in the form of aluminum chloride absorbed by fresh hydrocarbon, and supplied to the contact chamber when needed, as hereinafter described.

Reflux chamber 14 is constructed in its upper portion with a plurality of vertical vapor tubes 20 mounted between heads 21 and 22 and adapted to be surrounded by a cooling path of water entering through pipe 23 and escaping through pipe 24. The supply of cooling water will be regulated by a thermostat 25 in the pipe 15 which controls a valve 26 in the pipe 23.

Before the catalyst has been circulated through contact chamber 6, pipe 9, and distributing head 8, a sufficient time to impair its catalytic activity beyond a desired point, it will be revivified by arresting flow through the head 8, as, for instance, by turning the head through the medium of worm gear 27 to bring its ports 8ᵃ into greater or lesser coincidence with the ports 9ᵃ of the pipe 9 (Figures 3 and 4), and permitting it to escape in a finely subdivided spray through the nozzle 28 into vaporizing chamber 29 where the aluminum chloride will be released from the heavy hydrocarbon, and the latter will be directed by the funnel 30 into the tray 31, whence it can be discarded through pipe 32.

In this operation, the discharge of superheated gas through the nozzles 11ᵃ, 11ᵇ and 11ᶜ will preferably be increased sufficiently to develope the discharge through the nozzle 28 in subdivided form and at subliming temperature. The released and now volatile aluminum chloride will escape through pipe 13 as in the case of the distillate of the oil, passing upward through perforated plates 33, and will meet a spray of cold hydrocarbon of proper gravity delivered through the spraying crown 34 and cooler 35 by a pump 36. Any aluminum chloride or hydrocarbon fractions that escape the spraying crown 34, other than the very light distillates which are desired to pass through pipe 15, will be thrown down by the tubular condenser 20 already referred to.

Precipitate in reflux or absorption chamber 14, as well as the absorbing hydrocarbon, will ordinarily be directed through pipes 19 and 42 into the settling tank 39, where the aluminum chloride hydrocarbon will settle at the bottom, as suggested at 40, and free hydrocarbon will accumulate above, as suggested at 41. Pump 36 will draw its supply of hydrocarbon from the stratum 41 in the tank 39, and this hydrocarbon can be circulated through cooler 35, spray crown 34, and absorption chamber 14 as many times as may be necessary to develope aluminum chloride hydrocarbon containing the desired percentage of aluminum chloride. Pipe 42 leading from tank 39 to pipe 19, controlled by valve 42ᵃ, will serve to deliver fresh aluminum chloride hydrocarbon catalyst to the contact chamber 6 whenever the same may be needed. Valves 19ᵃ and 19ᵇ in pipe 19, serve to send the flow of precipitate directly back to contact chamber 6 during catalyzation, or to send the absorbing body of oil together with the absorbed aluminum chloride to the tank 39 while sublimation of the catalyst is going on.

In case it should be desired to circulate the same absorption oil repeatedly through the absorption chamber 14 in order to insure saturation with aluminum chloride, a pipe 37 connects the lower end of the absorption chamber 14 directly with the pump 36 so that by opening valve 37ᵃ and closing valve 37ᵇ the oil may be routed in this path.

Oil to be treated may be charged into the apparatus through pipe 43 controlled by valve 43ᵃ, and when so charged, valve 37ᵃ may be closed and valves 19ᵃ, 19ᵇ opened in order that the oil to be treated may flow directly to the catalyzing apparatus.

The terms "reflux chamber" and "absorption chamber" have both been used for the element 14, because this portion of the apparatus serves the purposes of both. That is to say, when distillation is going on, it serves to cause reflow into the catalyzing chamber of heavier fractions as well as aluminum chloride that pass over with the volatiles desired to be recovered, and when the catalyst is being recovered it serves to cause the aluminum chloride vapors to be absorbed and the light hydrocarbon pumped from the chamber 39. In order to supply the desired quality of oil to the chamber 39, pipe 39ᵃ will preferably be employed, although in working with some grades of oil, oil to be treated, which enters through the pipe 43, might be used for this purpose.

For the gas introduced through the nozzles 11ᵃ, 11ᵇ, 11ᶜ, for elevating the catalyst, a fixed hydrocarbon gas from the still will preferably be employed, as this will have the effect of hydrogenating the oil, and supply of hydrogenating oil will preferably be made in both the treating step and in the catalyst recovery step. The use of such a gas is particularly advantageous in treating an oil containing a large constituent of unsaturated hydrocarbon.

According to the form shown in Figure 2, the superheated gas injector 11ᵃ delivers into a tube 9ᵃ that is separate and distinct from that which constitutes the return flow passage of the catalyst, and the latter is developed by the tube 8ᵃ having a spreading discharge end 8ᵇ and an Archimedean screw 11ᵈ; said tubes 8ᵃ and 9ᵃ being mounted one upon the other and receiving rotation from a shaft 11ᵉ through the medium of gears 11ᵈ. In this instance, revivification or sublimation of the catalyst may take place simultaneously with catalyzation of the oil being treated. The tube 1 constituting the heating wall, the tube 6 constituting the contact chamber and developing with said wall the return flow passage 7 for the oil, the settling chamber 10 for the catalyst, and the funnel 30, tray 31, and discard pipe 32 may be of the same construction and arrangement in Figure 2 as already described with reference to Figure 1.

The process and apparatus here described may be employed for the treatment of any distillate of petroleum that has been substantially freed from water, for instance, kerosene, prime white distillate, gas oil, paraffin distillate, or fuel oil. Temperatures at which the oil will be treated will be from 300° F. to 550° F. The percentage of aluminum chloride used will vary from about 4% by weight for light distillates such as kerosene, to 10% by weight for heavy fuel oils. The percentage of gasoline produced from a charge will vary from 80% in the case of kerosene to 30% in the case of heavy fuel oil.

I claim:

1. The method of treating oil to produce low boiling hydrocarbon which consists in flowing the oil to be treated together with aluminum chloride hydrocarbon catalyst, through a catalyzing chamber, separating the oil from the catalyst and returning it to the catalyzing chamber alongside a wall thereof, and applying heat to the returning body of oil, on a side thereof that is remote from the catalyzing chamber; the oil in the catalyzing chamber being maintained at a temperature favorable to catalyzation, and vapors being removed.

2. The method of treating oil to produce low boiling hydrocarbon which consists in flowing the oil to be treated together with aluminum chloride hydrocarbon catalyst, through a catalyzing chamber, separating the oil from the catalyst and returning it to the catalyzing chamber alongside a wall thereof, applying heat to the returning body of oil, on a side thereof that is remote from the catalyzing chamber and returning the catalyst through a separate path remote from the return flow path of the oil; the oil in the catalyzing chamber being maintained at a temperature favorable to catalyzation, and vapors being removed.

3. The method of treating oil to produce low boiling hydrocarbons which consists in circulating the oil to be treated and aluminum chloride hydrocarbon catalyst by passing them together in one direction through a common path, then returning them separately through independent flow paths in heat transferring relation to the material in said common path and applying heat to the return flow body of oil on the side thereof remote from the common path and from the return flow body of catalyst; the oil being maintained at a temperature favorable to catalyzation while flowing through the common path, and vapors being removed.

4. The method of treating oil to produce low boiling hydrocarbon, which consists in circulating the oil to be treated and aluminum chloride hydrocarbon catalyst, respectively, through separate paths which coincide in part and of which the portion of the path traversed separately by the oil to be treated surrounds the coinciding portion, and heating the oil in said portion of the path which it traverses separately; the oil in said coinciding portion of the path being maintained at a temperature favorable to catalyzation, and vapors being removed.

5. The method of treating oil to produce low boiling hydrocarbon, which consists in circulating the oil to be treated and aluminum chloride hydrocarbon catalyst, respectively, through separate paths which coincide in part, that portion of the path traversed separately by the catalyst being concentrically within the portions of the paths which coincide, the oil being heated in the portion of its path which it traverses separately; temperatures being kept up to a degree favorable to catalyzation where the paths coincide, and vapors being removed.

6. The improvement in the art of treating oils to produce low boiling hydrocarbon, which consists in circulating the oil to be treated and aluminum chloride hydrocarbon catalyst, respectively, through separate paths which coincide in part, heating the oil in the portion of its path which it traverses separately, maintaining temperature favorable to catalyzation where the paths coincide, removing vapors, and periodically delivering the catalyst through the portion of its path which it traverses separately to a subliming chamber.

7. The improvement in the art of treating oils to produce low boiling hydrocarbons, which consists in circulating the oil to be treated and aluminum chloride hydrocarbon catalyst, respectively, through separate paths coinciding in part, and heating the oil and the catalyst, respectively, in the portions of their paths which they traverse separately; temperature favorable to catalyzation being maintained where the paths coincide, and vapors being removed.

8. The improvement in the art of treating oils to produce low boiling hydrocarbons, which consists in circulating the oil to be treated and aluminum chloride hydrocarbon catalyst, respectively, through separate paths, coinciding in part, heating the oil in the portion of its path which it traverses separately, and injecting a hot gas into the catalyst in the portion of its path which it traverses separately; temperature favorable to catalyzation being maintained where the paths coincide, and vapors being removed.

9. The improvement in the art of treating oils to produce low boiling hydrocarbons, which consists in circulating the oil to be treated and aluminum chloride hydrocarbon catalyst, respectively, through separate paths, coinciding in part heating the oil in the portion of its path which it traverses separately and injecting a hot gas suitable for hydrogenation into the catalyst in the portion of its path which it traverses separately, temperature favorable to catalyzation being maintained where the paths coincide, and vapors being removed.

10. The improvement in the art of treating oils to produce low boiling hydrocarbons, which consists in circulating the oil to be treated and aluminum chloride hydrocarbon catalyst, respectively, through separate paths, coinciding in part, heating the oil in the portion of its path which it traverses separately and injecting a hot gas into the catalyst in the portion of its path which it traverses separately; temperature favorable to catalyzation being maintained where the paths coincide, vapors being removed, and the injection of gas into the catalyst being periodically regulated to develop a subliming action in the catalyst.

11. The improvement in the art of treating oils to produce low boiling hydrocarbons, which consists in circulating the oil to be treated and aluminum chloride hydrocarbon catalyst, respectively, through paths which coincide in part maintaining temperature favorable to catalyzation where the paths coincide, removing vapors therefrom, periodically developing subliming action in the catalyst in the portion of its path which it traverses separately, absorbing the volatiles of said subliming action by fresh hydrocarbon, and returning aluminum chloride hydrocarbon to the place of treatment.

12. The improvement in the art of treating oils to produce low boiling hydrocarbons, which consists in circulating the oil to be treated and aluminum chloride hydrocarbon catalyst, respectively, through paths coinciding in part, temperature favorable to catalyzation being maintained where the paths coincide, drawing off volatiles resulting from catalyzation, and precipitating aluminum chloride that passes off with said volatiles and returning it to the place of treatment.

13. In an apparatus for treating oil to produce low boiling hydrocarbon, a contact chamber forming a portion of a circulatory passage for both oil to be treated and a catalyst to act upon the oil, return flow passages serving, respectively, for the oil and for the catalyst communicating with the respective ends of said contact chamber, and a catalyst subliming chamber above said contact chamber.

14. In an apparatus for treating oil to produce low boiling hydrocarbon, a contact chamber forming a portion of a circulatory passage for both oil to be treated and a catalyst to act upon the oil, return flow passages serving, respectively, for the oil and for the catalyst communicating with the respective ends of said contact chamber, a catalyst subliming chamber above said contact chamber into which the return flow catalyst passage is adapted to discharge, and means for raising the temperature of the catalyst as it flows through the last-named passage and discharging it into said subliming chamber at subliming temperature.

15. In an apparatus for treating oil to produce low boiling hydrocarbon, a contact chamber forming a portion of a circulatory passage for both oil to be treated and a catalyst to act upon the oil, return flow passages serving, respectively, for the oil and for the catalyst communicating with the respective ends of said contact chamber, a catalyst subliming chamber above said contact chamber into which the return flow catalyst passage is adapted to discharge, and means for raising the temperature of the catalyst as it flows through the last-named passage and discharging it into said subliming chamber at subliming temperature; there being between said subliming chamber and said contact chamber means for collecting and discharging the residue of the catalyst sublimation.

16. In an apparatus for treating oil to produce low boiling hydrocarbon, a vertically arranged cylindrical contact chamber opening at top and bottom, a cylinder surrounding said contact chamber spaced therefrom and providing a return flow oil passage communicating at top and bottom with said contact chamber, means exterior to said surrounding cylinder for heating the same, and a pipe arranged within said contact chamber, extending from a point below the communication between the contact chamber and return flow oil passage upwardly to near the upper end of said contact chamber, and there provided with a discharge outlet through which it delivers catalyst to oil entering the contact chamber.

17. In an apparatus for treating oil to produce low boiling hydrocarbon, a vertically arranged cylindrical contact chamber adapted for the downward passage therethrough of oil mingled with a catalyst, and a cylindrical wall surrounding said contact chamber, extending beyond the upper and lower ends thereof, and providing therewith an upflow return oil passage, means for heating the exterior of said cylindrical wall, a catalyst settling chamber beyond the lower end of the contact chamber, a pipe rising from said catalyst settling chamber vertically through the contact chamber, a catalyst distributing head on said pipe near the upper end of the contact chamber, and means for inducing a flow of catalyst upward through said pipe.

18. In an apparatus for treating oil to produce low boiling hydrocarbon, a vertically arranged cylindrical contact chamber adapted for the downward passage therethrough of oil mingled with a catalyst, and a cylindrical wall surrounding said contact chamber, extending beyond the upper and lower ends thereof, and providing therewith an upflow return oil passage, means for heating the exterior of said cylindrical wall, a catalyst settling chamber beyond the lower end of the contact chamber, a pipe rising from said catalyst settling chamber vertically through the contact chamber, a catalyst distributing head on said pipe near the upper end of the contact chamber, means for inducing a flow of catalyst upward through said pipe, a catalyst subliming chamber above said contact chamber, an extension on said pipe delivering into said subliming chamber, and means for changing the flow of catalyst through said pipe, from the distributing head to said extension.

19. In an apparatus for treating oil to produce low boiling hydrocarbon, a contact chamber, return flow passages serving respectively for oil and catalyst communicating with the ends of said contact chamber, a subliming chamber above said contact chamber, means for diverting catalyst into said subliming chamber, an absorption chamber receiving volatiles from said subliming chamber, a settling tank receiving drainage from said absorption chamber, and means for discharging into the contact chamber at will a stratum of material from said tank.

20. In an apparatus for treating oil to produce low boiling hydrocarbon, a contact chamber adapted for the flow therethrough of oil to be treated together with a catalyst, a subliming chamber above said contact chamber, an absorption chamber communicating with said subliming chamber, a stratifying tank receiving drainage from said absorption chamber, means for circulating oil from said stratifying tank repeatedly through said absorption chamber, and means for delivering a stratum of material from said tank to said contact chamber.

Signed at Chicago, Illinois, this 28th day of March, 1922.

ERNEST V. OWENS